United States Patent Office 3,598,766
Patented Aug. 10, 1971

3,598,766
POLYMERIC HETEROCYCLIC NITROGEN COMPOSITIONS
Carl S. Marvel, Tucson, Ariz., and Domenico Fabbro, St. Paul, Minn., assignors to Research Corporation, New York, N.Y.
No Drawing. Filed Nov. 5, 1968, Ser. No. 773,676
Int. Cl. C08g 33/02
U.S. Cl. 260—2                         1 Claim

ABSTRACT OF THE DISCLOSURE

Poly(benzene - 1,2:4,5 - tetrayl - 1,2 - diimino) having desirable high-temperature stability is prepared by the self-condensation of 1,2,4,5 - tetraaminobenzene in polyphosphoric acid.

---

This invention relates to polymeric heterocyclic nitrogen compositions.

The compositions of the present invention are characterized by the presence of a phenazine or 9,10-dihydrophenazine nucleus in their structure, and are further characterized by high melting points, a high degree of thermal stability and resistance to oxidation at elevated temperatures. These compositions are particularly useful in the preparation of oxidation- and corrosion-resistant articles capable of use at temperatures in excess of 400° C.

The compositions of the present invention are the polymers made by the self-condensation of the aromatic tetraamines, 1,2,4,5-tetraaminobenzene, 3,3',4,4'-tetraaminodiphenyl ether, 3,3'-diaminobenzidine and 3,3',4,4' - tetraaminodiphenyl sulfone. The reactant tetraamine, usually as its hydrochloride salt, is heated in polyphosphoric acid at temperatures of 250–350° C. to effect condensation via adjacent amine pairs. The polymers obtained are considered to have the repeating units indicated below:

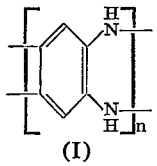

(I)

Poly(benzene-1,2:4,5-tetrayl-1,2-diimino) from 1,2,4,5-tetraaminobenzene

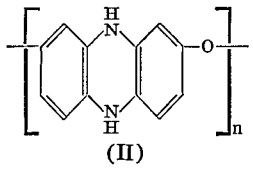

(II)

Poly (9H, 10H-phenazine-2,7-diyl-2-oxy) from 3,3',4,4'-tetraaminodiphenyl ether

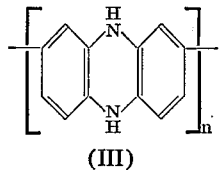

(III)

Poly (9H, 10H-phenazine-2,7-diyl) from 3,3'-diaminobenzidine and

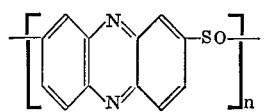

Poly(phenazine-2,7-diyl-2-sulfinyl) from 3,3',4,4'-tetraaminodiphenyl sulfone

While a certain amount of oxidation takes place during condensation, the first three polymers are primarily in the dihydro form as indicated. The latter polymer has the central heterocyclic ring in the fully aromatic form and is postulated as resulting from internal oxidation-reduction of the dihydrosulfonyl intermediate

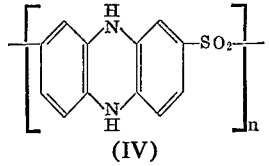

(IV)

As mentioned above, the polymer compositions of the present invention resist oxidation at temperatures even in excess of 400° C. The polymer from 1,2,4,5 - tetraaminobenzene loses only 10% of its weight at temperatures up to 600° C. The polymer from 3,3',4,4' - tetraaminodiphenyl ether loses only 14% of its weight at temperatures up to 900° C., and that from 3,3'-diaminobenzidine lost 20% of its weight at temperatures up to 900° C. These polymers may be fabricated or incorporated into shaped articles wherein their unique stability to elevated temperatures may be effectively utilized. Similarly, the polymers in film form may be used to protect other articles from corrosion and other adverse effects accelerated by exposure to elevated temperatures.

EXPERIMENTAL

Polyphosphoric acid was prepared from analytical grade phosphorus pentoxide and distilled water to avoid metal contaminants as follows:

In a 500 ml. three-necked round-bottom flask fitted with a mechanical stirrer, inlet tube for nitrogen, and dropping funnel, was placed 100 g. of analytical grade phosphorus pentoxide. The flask was cooled with an ice bath, the solid was stirred and a slow current of nitrogen was maintained while very slowly 40 ml. of distilled water was added. At the end, the temperature was slowly raised to 120° C. and the heating was continued under a slow current of nitrogen for 24 hours. The viscous product so obtained was almost colorless.

Polymerization of 1,2,4,5-tetraaminobenzene

Seven and one-tenth g. (0.025 mole) of 1,2,4,5-tetraaminobenzene tetrahydrochloride was mixed with 120 g. of polyphosphoric acid, prepared as above, in a 500 ml. three-necked round-bottom flask and the apparatus was evacuated three times and filled with nitrogen. Then the mixture was heated carefully at 100° C. with stirring in a nitrogen atmosphere until the end of the foaming due to the evolution of hydrogen chloride. The mixture was then heated at 180° C. overnight and at 250° C. for 5 hours. After cooling under nitrogen, ammonium carbonate and a little ion-free water was added, and the mixture poured into a blender containing 1500 ml. of saturated ammonium carbonate solution, centrifuged and extracted with water for 2 weeks and dried. It was next extracted with 95% ethyl alcohol until the extraction liquor, initially pink, became colorless. The yield of blue-black polymer was 2.2 g. (84.5%) M.P. >360° C. Inherent viscosity 0.42 (0.2% conc. $H_2SO_4$ at 30° C.). The polymer product was slightly soluble in methanesulfonic acid and concentrated sulfuric acid. Its analysis was consistent with the structure poly-(benzene-1,2:4,5-tetrayl-1,2,-diimino).

Polymerization of 3,3',4,4'-tetraaminodiphenylether tetrahydrochloride

To 120 g. of polyphosphoric acid cooled to room temperature, was added 5.75 g. (0.0156 mole) of 3,3',4,4'- tetraaminodiphenyl ether tetrahydrochloride. The flask was evacuated and filled with nitrogen repeatedly. The mixture was heated at 330° for 4 hours and then cooled. A few grams of ammonium carbonate and 50 ml. of distilled water were added and the mixture was carefully poured into 2000 ml. of distilled water. After filtration, it was extracted with water for 5 days and with 95% ethyl alcohol for 10 days. The yield was 2.0 g. (67.3%) M.P. >360° C. Inherent viscosity 0.19 (0.2% conc. $H_2SO_4$ at 30° C.). The analysis was consistent with the structure poly (9H, 10H-phenazine-2,7-diyl-2-oxy).

Polymerization of 3,3'-diaminobenzidine 3,3'-diaminobenzidine (5 g., 0.0234 mole) was mixed with 120 g. of polyphosphoric acid prepared as above. The apparatus was evacuated three times and filled with nitrogen, then heated in nitrogen atmosphere to 340° C. during one half hour and then held at this temperature under stirring for 9 hours. The dark mixture so obtained was cooled to 100° C., carefully poured into 2000 ml. of well stirred distilled water, and heated for 6 hours. The product was decanted and heated two more times with two liters of distilled water, then dried and extracted in a Soxhlet with 95% ethyl alcohol for 90 hours to remove unreacted 3,3'-diaminobenzidine and then dried again under vacuum. The yield was 2.4 g. (57%) M.P. >360° C. Inherent viscosity 0.43 (0.2% conc. $H_2SO_4$ at 30° C.). The analysis was consistent with the structure poly (9H, 10H-phenazine-2,7-diyl).

Polymerization of 3,3',4,4',-tetraaminodiphenylsulfone

A mixture of 3.2 g. (0.0115 mole) of 3,3',4,4'-tetraaminodiphenylsulfone and 120 g. of polyphosphoric acid prepared as above was placed in a 200 ml. flask. The flask was evacuated under stirring and filled with dry nitrogen three times. The mixture was then heated at 250° C. for 9 hours. The color of the mixture changed rapidly to purple and then deep blue. At the end of the reaction, the mixture was cooled down and ammonium carbonate and a little ion-free water was added. The solid was placed in 1500 ml. of distilled water saturated with ammonium carbonate. The suspension was centrifuged, dried and the solid was extracted with water for a week, then with 95% ethyl alcohol for 10 days. The black polymer thus obtained had a very low solubility in methanesulfonic or sulfuric acid. The yield was 2.56 g. (82%) M.P. >360° C. Based on the analytical data obtained, the product is best represented as having the structure poly(phenazine-2,7-diyl-2-sulfinyl).

We claim:
1. Poly(benzene-1,2:4,5-tetrayl-1,2-diimino).

References Cited
UNITED STATES PATENTS

| | | | |
|---|---|---|---|
| 3,174,947 | 3/1965 | Marvel et al. | 260—2 |
| 3,326,915 | 6/1967 | Jackson et al. | 260—2 |
| 3,418,261 | 12/1968 | Idelson et al. | 260—2 |

SAMUEL H. BLECH, Primary Examiner

U.S. Cl. X.R.

260— 30.8, 47, 79.3